Patented Feb. 22, 1944

2,342,100

UNITED STATES PATENT OFFICE 2,342,100

PREPARATION OF UNSATURATED HALOGENATED ALIPHATIC HYDROCARBONS

Oliver W. Cass, Niagara Falls, N. Y., assignor to E. I. du Pont de Nemours & Company, Wilmington, Del., a corporation of Delaware No Drawing. Application June 4, 1940, Serial No. 338,803

11 Claims. (Cl. 260—654)

This invention relates to the preparation of unsaturated organic compounds and more particularly to the preparation of unsaturated halogenated aliphatic compounds such as halogenated hydrocarbons.

In the preparation of trichlorethylene and other unsaturated halogenated hydrocarbons, the method commonly used consists in first preparing a halogenated hydrocarbon containing one atom of halogen more than that required in the final product and treating the halogenated compound with an alkaline material whereby the halogen acid is removed from the molecule. For example, tetrachlorethane may be reacted with an alkaline material to split off HCl, to produce trichlorethylene. Similarly, it has been proposed to subject chlorinated hydrocarbons to cracking temperatures, whereby hydrochloric acid is split off to form the unsaturated compounds. While these methods can be operated efficiently to give the desired unsaturated chlorohydrocarbon or other unsaturated halogen compound in good yield, this method has the disadvantage that part of the chlorine first introduced by chlorination has to be removed from the molecule and thereby generally is wasted. In some cases, as for example, by cracking, the chlorine can be recovered as HCl, but such recovery adds to the cost of the process and unless there is considerable outlet for the HCl, it is necessary to oxidize it to produce chlorine which can be re-used.

An object of the present invention is to provide a new and improved method for producing unsaturated organic aliphatic halogenated compounds, especially unsaturated halogenated hydrocarbons. Another object is to prepare trichlorethylene from beta-trichlorethane. A further object is to prepare perchlorethylene from tetrachlorethane. Another object is to prepare vinyl chloride from ethyl chloride. Other objects will be apparent from the following description of the invention.

These objects may be attained in accordance with the present invention by reacting oxygen with a halogenated aliphatic hydrocarbon having at least two carbon atoms, in the presence of an oxidation catalyst at a temperature of 300–600° C., preferably around 400° C. The halogenated hydrocarbon may be either saturated or unsaturated and must have at least one single bond. It may contain one or more halogen atoms and must contain at least two hydrogen atoms. For example, tetrachlorethane is converted to perchlorethylene by my process according to the following equation:

$$2CHCl_2-CHCl_2+O_2 \rightarrow 2CCl_2=CCl_2+2H_2O$$

Likewise, ethyl chloride is converted to vinyl chloride:

$$2CH_3-CH_2Cl+O_2 \rightarrow 2CH_2=CHCl+2H_2O$$

Beta-trichlorethane (1,1,2-trichlorethane) is converted by my method to trichlorethylene:

$$2CHCl_2-CH_2Cl+O_2 \rightarrow 2CCl_2=CHCl+2H_2O$$

Examples of still other conversions affected by my process are as follows:

$$2CH_2Cl-CH_2Cl+O_2 \rightarrow 2CHCl=CHCl+2H_2O$$
$$2CH_3-CHCl_2+O_2 \rightarrow 2CHCl=CHCl+2H_2O$$
$$2CH_2Br-CH_2Br+O_2 \rightarrow 2CHBr=CHBr+2H_2O$$
$$2CH_3CH_2CH_2Cl+O_2 \rightarrow 2CH_2=CH-CH_2Cl+2H_2O$$
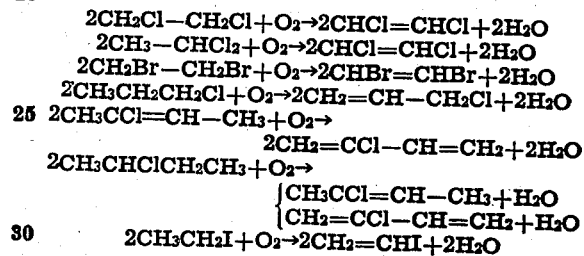
$$2CH_3CH_2I+O_2 \rightarrow 2CH_2=CHI+2H_2O$$

The reaction may be carried out by mixing the halogenated hydrocarbon vapor with air or oxygen and passing the mixture over the catalyst in a heated tube or reaction chamber. Alternately, the hydrocarbon and oxygen may be introduced into the reaction chamber in separate streams. In practicing my invention, I have utilized as reaction chamber a stainless steel, nickel, or quartz tube heated in an electric furnace arranged so that the temperature of the furnace and the tube can be easily controlled. The invention is not restricted to the use of this type of apparatus; the various known methods and apparatus for conducting catalytic reactions at elevated temperatures may be utilized for my invention. The proportions of halogenated hydrocarbon and oxygen may be varied over wide limits. I prefer to use at least one mol of oxygen for each mol of halogenated hydrocarbon to be reacted; however, a large excess of either reactant, for example, an excess of 50% or more, may be used if desired.

Generally, side reactions will occur. For example, part of the halogenated hydrocarbon may be completely oxidized to carbon monoxide and water, but this can be kept to a very small amount by proper control of the temperature, and space velocity by avoiding a too large excess of oxygen and by adding diluent gases. In general, by maintaining a temperature of not over 400–500° C., the amount of oxidation to carbon monoxide will be very small, i. e., of the order of 2–3%. Other side reactions may occur by cracking to eliminate the halogen acid. For example, when tetrachlorethane is oxidized in accordance with my process, a minor proportion of the tetrachlorethane is converted into trichlorethylene with the formation of a corresponding amount of HCl. A certain proportion of the HCl thus formed in the presence of some catalysts used also may be oxidized in situ to form chlorine and the chlorine thus formed tends to react, especially with the unsaturated compounds formed by the main reaction or by the cracking reaction. The extent to which such side reactions occur will depend in general on the proportion of oxygen used, the temperature, space velocity, the nature of the catalyst, and the nature of the halogenated hydrocarbon utilized. By controlling these factors, the amounts of the by-products in the gas leaving the reaction space generally may be controlled within rather wide limits. In most cases, the by-products themselves are valuable and may readily be separated from the vapors leaving the reactor. For example, in the oxidation of tetrachlorethane to perchlorethylene by proper adjustment of the conditions, the reaction product will consist chiefly of perchlorethylene with a minor but appreciable amount of trichlorethylene and small to practically negligible amounts of other products. The valuable perchlorethylene and trichlorethylene can easily be separated from the reaction products by fractional distillation. This provides a useful and economical method for producing perchlorethylene and trichlorethylene which are valuable solvent materials and I have found that these products made by my process from tetrachlorethane after separation by a single fractionation of the neutralized and dried product are of high purity and very stable.

The use of an oxidation catalyst is essential to promote the reaction between oxygen and two atoms of hydrogen to obtain good yield of the desired unsaturated product. A great variety of materials are suitable as catalysts for my reaction. In general, I may employ practically any metal, metal oxide or metal salt or other metal compound. I have even found that particles of Pyrex glass have some catalytic effect probably because of metal oxides in the glass. The catalysts used may be compounds of either heavy metals or light metals, for example, zinc oxide and barium oxide have a small but appreciable catalytic effect and alumina in the form of alumina gel is a fairly effective catalyst. In general, the heavy metals are better catalysts than the light metals although there are exceptions; for example, the catalytic effect of lead oxide in one experiment was found to be about the same as that of barium oxide. The best results have been obtained with oxides or compounds of copper, iron, and bismuth. Copper was found to be outstandingly better than any other catalyst tried.

In the copper catalyst used the copper initially may be in the metallic state, copper oxide or a copper salt.

I prefer to utilize the catalysts on refractory supports such as pumice, silica gel, alumina gel, fire brick, porcelain, or the like. Such supported catalysts may readily be prepared by saturating a porous refractory material with a solution of the metal salt or metal compound. If the metal compound used is readily converted to the oxide under the conditions of the reaction, it is simply necessary to dry the saturated catalyst support and then it is ready for use. In other cases, it may be preferable to first reduce the metal compound on the support to the metallic form which then may be oxidized, preferably by heating the catalyst in an atmosphere of air or oxygen prior to use. The various methods known for preparing catalysts according to these principles may be utilized in practicing my invention. I have obtained excellent results in a large number of reactions by saturating fire brick with solutions of copper salts such as the sulfate, nitrate, or chloride.

In addition to the examples mentioned above, the following three examples illustrate in more detail methods of practicing my invention and the results obtained thereby.

EXAMPLE I

CONVERSION OF TETRACHLORETHANE TO PERCHLORETHYLENE

The equipment used for this process consisted of a 30″ stainless steel (or nickel) tubular reactor, 3″ I. D., electrically heated and wired so that each half is controlled by a separate rheostat. The tetrachlorethane was fed from a reservoir through a meter into a vertical stainless steel (or nickel) preheater, 3 ft. long and 2″ I. D., packed with porcelain rings. The tetrachlorethane vapors were then led through a T connection, through which oxygen was introduced and the mixed gases then passed into the reactor. The reactor also was provided with a stainless steel inlet tube adapted to introduce oxygen into the center of the reactor. Thus, the oxygen could be introduced either at the T connection, or directly into the reactor or at both locations. The oxygen flow was measured by means of a wet-test meter. The exit gases from the reactor were passed into an iced receiver, through two water scrubbers and a NaOH scrubber to a flask in a bath cooled with solid $CO_2$. This flask in turn was connected through a $CaCl_2$ drying tube and a trap cooled with solid $CO_2$ to a wet-test meter. The uncondensed gases leaving the apparatus were sampled from time to time for analysis. The reactor was packed with about 1½ liters of a catalyst consisting of porous fire brick broken into cubes about ¼″ square, impregnated with copper oxide.

The tetrachlorethane was fed at approximately 10 cc. per minute (0.10 mol/min.) into the preheater at 250°–300° C. and mixed with 0.025–0.05 mol of oxygen per minute and the mixture passed into the reactor, where the temperature was maintained at 400°–500° C. The crude product which collected in the iced receiver (together with a small amount collected in the cooled flask), was neutralized with lime, steam distilled, dried, and fractionally distilled to obtain pure perchlorethylene and pure trichlorethylene.

The results obtained from three typical runs were as follows:

Run A

[Reaction temperature 400–480° C.]

|  | Grams | Mols |
|---|---|---|
| Tetrachlorethane fed | 1,650 | 9.83 |
| Oxygen fed | 98% of theory | 4.82 |
| Crude (dry) product | 1,478 | |
| HCl evolved | 106 | 2.9 |
| Per cent CO+CO$_2$ in uncondensed offgas | 20% | |
| Uncondensed offgas | 1.0 cu. ft. | |

PRODUCTS OF FRACTIONAL DISTILLATION

|  | Grams | Wt. per cent | Mols | Mol per cent |
|---|---|---|---|---|
| Trichlorethylene | 302 | 20.4 | 2.30 | 23.4 |
| Perchlorethylene | 1,004 | 68.0 | 6.06 | 61.7 |
| Tetrachlorethane | 9 | 0.6 | 0.05 | 0.5 |
| Mol percent conversion | | | | 91.2 |

Run B

[Reaction temperature 400°–500° C.]

|  | Grams | Mols |
|---|---|---|
| Tetrachlorethane fed | 1,627 | 9.7 |
| Oxygen fed | 109% of theory | 5.27 |
| Crude (dry) product | 1,450 | |
| HCl evolved | 105 | 2.87 |
| Per cent CO+CO$_2$ in uncondensed offgas | 22% | |
| Uncondensed offgas | 1.45 cu. ft. | |

PRODUCTS OF FRACTIONAL DISTILLATION

|  | Grams | Wt. per cent | Mols | Mol per cent |
|---|---|---|---|---|
| Trichlorethylene | 264 | 18.2 | 2.01 | 20.7 |
| Perchlorethylene | 1,010 | 69.7 | 6.08 | 62.7 |
| Tetrachlorethane | 15 | 1.0 | 0.09 | 0.9 |
| Mol per cent conversion | | | | 88.8 |

Run C

[Reaction temperature 400°–500° C.]

|  | Grams | Mols |
|---|---|---|
| Tetrachlorethylene fed | 1,649 | 9.83 |
| Oxygen fed | 110% of theory | 5.41 |
| Crude (dry) product | 1,369 | |
| HCl evolved | 139 | 3.8 |
| Per cent CO+CO$_2$ in uncondensed offgas | 85% | |
| Uncondensed offgas | 1.8 cu. ft. | |

PRODUCTS OF FRACTIONAL DISTILLATION

|  | Grams | Wt. per cent | Mols | Mol per cent |
|---|---|---|---|---|
| Trichlorethylene | 208 | 14.9 | 1.58 | 16.07 |
| Perchlorethylene | 1,092 | 79.1 | 6.60 | 67.80 |
| Tetrachlorethane | 12 | 0.9 | 0.07 | 0.73 |
| Mol per cent conversion | | | | 85.6 |

Tests of the perchlorethylene made from these runs showed that it was of a high degree of purity and superior in stability to the best grades obtainable on the market.

EXAMPLE II

CONVERSION OF BETA-TRICHLORETHANE TO TRICHLORETHYLENE

Beta-trichlorethane (1,1,2-trichlorethane) was reacted with oxygen, using the procedure and apparatus described in Example I. The following results were obtained:

Run A

[Catalyst: Copper oxide on porous brick. Reaction temperature 375–525° C.]

|  | Grams | Mols |
|---|---|---|
| Beta-trichlorethane fed | 1,425 | 10.68 |
| Oxygen fed | 120% of theory | 6.85 |
| Crude (dry) product | 1,200 | |
| HCl evolved | 92 | 2.53 |
| Per cent CO+CO$_2$ in uncondensed offgas | 82% | |
| Uncondensed offgas | 2.19 cu. ft. | |

PRODUCTS OF FRACTIONAL DISTILLATION

|  | Grams | Mols | Mol per cent |
|---|---|---|---|
| Trichloroethylene | 518 | 2.25 | 36.9 |
| Dichloroethylene | 219 | 3.94 | 21.1 |
| Beta-trichloroethane | 28 | 0.21 | 5.7 |
| Mol percent conversion | | | 79.9 |

Run B

The catalyst, apparatus and conditions were similar to Run A, except that two reaction chambers were used, connected in series, and oxygen was fed into each. One catalyst chamber was a nickel tube; the other was a stainless steel tube. The data follows:

| | |
|---|---|
| Contact time_____sec__ | 23 |
| Preheater temperature____° C__ | 370–385 |
| Reaction temperature____° C__ | 440–480 |
| Beta-trichloroethane fed_____gms__ | 1468 (11.0 mols) |
| Oxygen fed_____mols__ | 3.57 |
| Crude (dry) product____gms__ | 1243 |
| Hydrogen chloride evolved_____gms__ | 101 (2.76 mols) |
| Oxygen off_____mols__ | 0.26 |
| Carbon dioxide off_____gms__ | 87 (1.98 mols) |
| Carbon monoxide off___mols__ | 0.56 |

PRODUCTS OF FRACTIONAL DISTILLATION

|  | Grams | Wt. per cent | Mols | Mol per cent |
|---|---|---|---|---|
| s-Dichloroethylenes | 228 | 18.5 | 23.5 | 21.4 |
| Trichloroethylene | 518 | 41.8 | 3.95 | 35.9 |
| Beta-trichloroethane | None | | | |
| Perchloroethylene | 359 | 29.0 | 2.16 | 19.6 |
| Tetra chloroethane | 95 | 7.7 | 0.57 | 5.2 |
| Penta chloroethane | 17 | 1.4 | 0.08 | 0.7 |
| Mol per cent conversion | | | | 82.8 |

Run C

The method of Run A was repeated, but using a catalyst made by saturating particles of porous fire brick with palladium chloride. The following data was obtained:

| | |
|---|---|
| Catalyst_____ | Palladium chloride on porous brick |
| Reaction temperature____° C__ | 460–500 |
| Tetra chloroethane fed_____gms__ | 1468 (8.73 mols) |
| Oxygen fed_____ | 85.5% of theory (3.74 mols) |
| Crude (dry) product____gms__ | 1125 |
| Hydrogen chloride evolved_____gms__ | 232 (6.36 mols) |

PRODUCTS OF FRACTIONAL DISTILLATION

|  | Grams | Wt. per cent | Mols | Mol per cent |
|---|---|---|---|---|
| s-Dichloroethylenes | 17 | 1.5 | 0.18 | 2.0 |
| Trichloroethylene | 334 | 29.7 | 2.54 | 29.1 |
| Perchloroethylene | 435 | 38.7 | 2.62 | 30.0 |
| Tetra chloroethane | 301 | 26.7 | 1.79 | 20.5 |
| Mol per cent conversion | | | | 61 |

EXAMPLE III

A large number of catalysts were utilized in carrying out the oxidation of tetrachlorethane to form perchlorethylene in accordance with the method described in Example I. The results obtained are shown in the following table:

| Catalyst used | Perchlorethylene in the crude reaction product |
|---|---|
| | Per cent by weight |
| Rare earth oxides on pumice | 16.5 |
| $CeO_2$—$CuCl_2$ on pumice | 23.8 |
| $CeO_2$ on pumice | 1.5 |
| $CuSO_4$ on pumice | 10.6 |
| CuO or ($CuCl_2$) on pumice | 15.5 |
| $CuSO_4$ on alumina | 53.5 |
| $CuSO_4$ on silica | 30.0 |
| $CuO.Cr_2O_3$ on brick | 51.8 |
| FeO on brick | 46.6 |
| CuO on brick | 70.0 |
| MgO on brick | 10.0 |
| MnO on brick | 8.6 |
| $CuPO_4$ on brick | 7.6 |
| AgO on brick | 5.1 |
| ZnO on brick | 6.7 |
| $Al_2O_3$ (alumina gel) | 15.6 |
| $Si_2O_3$ (silica gel) | |
| $TiO_2$ on brick | 13.6 |
| PbO on brick | 6.6 |
| BaO on brick | 6.9 |
| $Bi_2O_3$ on brick | 25.7 |
| CoO on brick | 14.3 |
| NiO on brick | 5.1 |
| $MgSO_4$ on brick | 11.7 |
| Pyrex glass | 6.0 |
| $MoO_3$ | 14.6 |
| $CuSO_4$ on alumina | 64.4 |

While I have described by invention and have illustrated it as a means for conversion of halogenated hydrocarbons to form unsaturated halogenated hydrocarbons, it is evident that the invention likewise may be utilized to convert other halogenated aliphatic compounds to unsaturated compounds without loss of halogen, in the same manner. In other words, it is obvious that the process which is suitable for conversion of the halogenated hydrocarbons may likewise be utilized for their derivatives formed by substituting one or more hydrogen atoms by various atoms or radicals. For example, the reaction may be employed to convert amines, alcohols, organic acids, ketones, and ethers where the molecule is a halogenated aliphatic or contains a halogenated aliphatic portion and contains at least one single bond capable of being converted to an unsaturated bond. In the case of readily oxidized materials such as amines and alcohols, in most cases oxidation of such readily oxidizable substituents will likewise occur. Thus, the reaction practiced on a halogenated alcohol with a copper catalyst generally will result in production of an unsaturated halogenated aldehyde, or acid, or both. In such cases, it is of course advisable to use sufficient oxygen as required for the total of the oxidation reactions which occur.

I claim:

1. A process for preparing an unsaturated halogenated hydrocarbon having halogen linked to an unsaturated carbon atom which comprises reacting oxygen at a temperature of 300 to 600° C. in the presence of an oxidation catalyst with a straight chain halogenated aliphatic hydrocarbon having from two to four carbon atoms, at least one pair of said carbon atoms being joined by a single bond, a hydrogen atom on each of the carbon atoms of said pair and a halogen atom on at least one of the carbon atoms of said pair which is selected from the group consisting of symmetrical tetrachlorethane, ethyl chloride, 1,1,2-trichlorethane, 1,2-dichlorethane, 1,1-dichlorethane, 1,2-dibromethane, 1-chlorpropane, 2-chlorbutene-2, 2-chlorbutane and ethyl iodide.

2. A process for preparing an unsaturated halogenated hydrocarbon having halogen linked to an unsaturated carbon atom which comprises reacting oxygen at a temperature of 300 to 600° C. in the presence of an oxidation catalyst comprising a substance selected from the group consisting of metals and their compounds with a straight chain halogenated aliphatic hydrocarbon having from two to four carbon atoms, at least one pair of said carbon atoms being joined by a single bond, a hydrogen atom on each of the carbon atoms of said pair and a halogen atom on at least one of the carbon atoms of said pair which is selected from the group consisting of symmetrical tetrachlorethane, ethyl chloride, 1,1,2-trichlorethane, 1,2-dichlorethane, 1,1-dichlorethane, 1,2-dibromethane, 1-chlorpropane, 2-chlorbutene-2, 2-chlorbutane and ethyl iodide.

3. A process for preparing an unsaturated halogenated hydrocarbon having halogen linked to an unsaturated carbon atom which comprises reacting oxygen at a temperature of 300 to 600° C. in the presence of an oxidation catalyst comprising a metal compound with a straight chain halogenated aliphatic hydrocarbon having from two to four carbon atoms, at least one pair of said carbon atoms being joined by a single bond, a hydrogen atom on each of the carbon atoms of said pair and a halogen atom on at least one of the carbon atoms of said pair which is selected from the group consisting of symmetrical tetrachlorethane, ethyl chloride, 1,1,2-trichlorethane, 1,2-dichlorethane, 1,1-dichlorethane, 1,2-dibromethane, 1-chlorpropane, 2-chlorbutene-2, 2-chlorbutane and ethyl iodide.

4. A process for preparing an unsaturated halogenated hydrocarbon having halogen linked to an unsaturated carbon atom which comprises reacting oxygen at a temperature of 300 to 600° C. in the presence of an oxidation catalyst comprising a metal oxide on a refractory support with a straight chain halogenated aliphatic hydrocarbon having from two to four carbon atoms, at least one pair of said carbon atoms being joined by a single bond, a hydrogen atom on each of the carbon atoms of said pair and a halogen atom on at least one of the carbon atoms of said pair which is selected from the group consisting of symmetrical tetrachlorethane, ethyl chloride, 1,1,2-trichlorethane, 1,2-dichlorethane, 1,1-dichlorethane, 1,2-dibromethane, 1-chlorpropane, 2-chlorbutene-2, 2-chlorbutane and ethyl iodide.

5. A process for preparing an unsaturated halogenated hydrocarbon having halogen linked to an unsaturated carbon atom which comprises reacting oxygen at a temperature of 300 to 600° C. in the presence of a copper-containing oxidation catalyst with a straight chain halogenated aliphatic hydrocarbon having from two to four carbon atoms, at least one pair of said carbon atoms being joined by a single bond, a hydrogen atom on each of the carbon atoms of said pair and a halogen atom on at least one of the carbon atoms of said pair which is selected from the group consisting of symmetrical tetrachlorethane, ethyl chloride, 1,1,2-trichlorethane, 1,2-dichlorethane, 1,1-dichlorethane, 1,2-dibromethane, 1-chlorpropane, 2-chlorbutene-2, 2-chlorbutane and ethyl iodide.

6. A process for preparing perchlorethylene which comprises reacting oxygen with symmetrical tetrachlorethane at a temperature of 300 to 600° C. in the presence of an oxidation catalyst.

7. A process for preparing perchlorethylene which comprises reacting oxygen with symmetrical tetrachlorethane at a temperature of 300 to 600° C. in the presence of a copper oxide catalyst.

8. A process for preparing trichlorethylene which comprises reacting oxygen with beta-trichlorethane at a temperature of 300 to 600° C. in the presence of an oxidation catalyst.

9. A process for preparing trichlorethylene which comprises reacting oxygen with beta-trichlorethane at a temperature of 300 to 600° C. in the presence of a copper oxide catalyst.

10. A process for preparing vinyl chloride which comprises reacting oxygen with ethyl chloride at a temperature of 300 to 600° C. in the presence of an oxidation catalyst.

11. A process for preparing vinyl chloride which comprises reacting oxygen with ethyl chloride at a temperature of 300 to 600° C. in the presence of a copper oxide catalyst.

OLIVER W. CASS.